United States Patent [19]

Fleckenstein

[11] 4,053,312

[45] Oct. 11, 1977

[54] O-SULFONAMIDONAPHTHOL DIFFUSIBLE DYE IMAGE PROVIDING COMPOUNDS

[75] Inventor: Lee J. Fleckenstein, Rochester, N.Y.

[73] Assignee: Eastman Kodak Company, Rochester, N.Y.

[21] Appl. No.: 503,128

[22] Filed: Sept. 4, 1974

[51] Int. Cl.$^2$ .................... G03C 7/00; G03C 5/54; G03C 1/40; G03C 1/76

[52] U.S. Cl. .................................. 96/3; 96/290; 96/73; 96/74; 96/77; 96/99; 96/100 R

[58] Field of Search ............. 96/3, 29 D, 77, 99, 96/100, 73, 74

[56] References Cited

U.S. PATENT DOCUMENTS

| | | | |
|---|---|---|---|
| 2,306,410 | 12/1942 | Schinzel | 96/100 |
| 2,774,668 | 12/1956 | Rogers | 96/3 |
| 3,443,939 | 5/1969 | Bloom et al. | 96/3 |
| 3,443,940 | 5/1969 | Bloom et al. | 96/3 |
| 3,443,941 | 5/1969 | Rogers | 96/3 |
| 3,443,943 | 5/1969 | Rogers et al. | 96/3 |
| 3,698,897 | 10/1972 | Gompf et al. | 96/3 |
| 3,734,726 | 5/1973 | Figueras et al. | 96/3 |
| 3,751,406 | 8/1973 | Bloom | 96/3 |
| 3,960,569 | 6/1976 | Ono | 96/77 |

FOREIGN PATENT DOCUMENTS

| | | | |
|---|---|---|---|
| 512,559 | 9/1939 | United Kingdom | 96/100 |

Primary Examiner—David Klein
Assistant Examiner—Richard L. Schilling
Attorney, Agent, or Firm—Harold E. Cole

[57] ABSTRACT

Color photographic elements, diffusion transfer film units and processes are described which employ nondiffusible o-sulfonamidonaphthols which are alkali-cleavable upon oxidation to release a diffusible color-providing moiety.

21 Claims, No Drawings

O-SULFONAMIDONAPHTHOL DIFFUSIBLE DYE IMAGE PROVIDING COMPOUNDS

This invention relates to photography and more particularly to color photography employing dye image-providing materials comprising o-sulfonamidonaphthols having a color-providing moiety attached through the sulfonamido group.

Color, diffusion transfer processes of the prior art such as U.S. Pat. No. 2,983,606 generally involve the use of a photographic element comprising a support coated with at least one silver halide emulsion layer having therein or contiguous thereto a dye developer. A liquid processing composition is applied to the photosensitive element and permeates the emulsion layer to dissolve the dye developer. As the exposed silver halide emulsion is developed, the oxidation product of the dye developer is immobilized or precipitated in situ with the developed silver, thereby providing an imagewise distribution of unoxidized dye developer dissolved in the liquid processing composition. This immobilization is apparently due, at least in part, to a change in the solubility characteristics of the dye developer upon oxidation, and particularly as regards its solubility in alkaline solutions. At least part of this imagewise distribution of unoxidized dye-developer is transferred to a superposed image-receiving layer to provide the transfer image.

In these prior art systems, the developer moiety of the dye developer is capable of developing any silver halide emulsion that it comes into contact with since it is a "reactive" species. For example, a cyan developer which is supposed to develop only the red-sensitive silver halide emulsion will develop the blue-sensitive or green-sensitive silver halide emulsion if development by the yellow and magenta dye developers, respectively, has not been completed by the time the cyan dye developer reaches these emulsions. Such unwanted development results in undesirable interimage effects. Accordingly, it is highly desirable to provide a transfer system in which the dye is not attached to a "reactive" moiety, such as a developer moiety, so that such dye can diffuse throughout the system without becoming immobilized in the "wrong" area. Thus, undesirable interimage effects are considerably reduced or eliminated to provide a transfer image with high color quality.

In U.S. Pat. Nos. 3,443,939; 3,443,940; 3,443,941, and 3,443,943, "splittable" ring-closing compounds such as dye developers are described wherein a diffusible dye moiety in split off the compound and transferred to provide the desired image while the remainder of the compound undergoes an internal cyclization or ring closing reaction, usually as a result of reaction with an oxidized aromatic primary amino color developing agent. In U.S. Pat. Nos. 3,227,550; 3,227,551 and 3,227,552, nondiffusible couplers are described in certain embodiments which release preformed dyes as a result of a coupling reaction with oxidized color developing agent. Canadian Pat. No. 602,607 disclosed p-phenylenediamine compounds which contain a dye moiety. These compounds can be oxidized to the quinonediamine and with subsequent treatment with strong alkali, deamination takes place releasing a diffusible dye for transfer to a reception layer. However, compounds are desired which provide improved dye-release mechanisms in photographic systems and which do not require the use of a color developing agent. In a particularly preferred embodiment of my invention, black and white developing agents are employed which provide certain advantages in speed of development, not causing dermatitis, etc.

In copending U.S. application Ser. No. 351,673, filed Apr. 16, 1973, now published as Trial Voluntary Protest No. B351,673, of my coworker, Figueras, and myself, we have disclosed and claimed, inter alia, p-sulfonamidoanilines, p-sulfonamidophenols and p-sulfonamidonaphthols in various photographic elements which were found to be alkali-cleavable upon oxidation to release a diffusible color-providing moiety. I have now found that o-sulfonamidonaphthols are also alkali-cleavable upon oxidation to release a diffusible color-providing moiety. This was an unexpected finding in view of the fact that closely related o-sulfonamidophenols were found to be very inferior.

A photographic element according to my invention comprises a support having thereon at least one photosensitive silver halide emulsion layer, each silver halide emulsion layer having associated therewith a nondiffusible o-sulfonamidenaphthol having a color-providing moiety attached through the sulfonamido group. These sulfonamido compounds may also be described as being alkali-cleavable upon oxidation to release a diffusible color-providing moiety from the benzene nucleus and having the following formula:

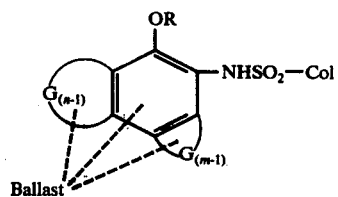

wherein:
1. Col is a dye or dye precursor moiety;
2. Ballast is an organic ballasting radical of such molecular size and configuration (e.g., simple organic groups or polymeric groups) as to render the compound nondiffusible during development in an alkaline processing composition;
3. R is hydrogen or an alkali labile group;
4. G represents an aromatic ring directly fused to the benzene nucleus to form a naphthalene nucleus; and
5. $n$ and $m$ are dissimilar positive integers of 1 to 2, i.e., when $n$ is 1, $m$ is 2 and when $n$ is 2, $m$ is 1.

A preferred process for producing a photographic transfer image in color according to my invention comprises:
1. treating the above-described photographic element, which has been exposed, with an alkaline processing composition in the presence of a silver halide developing agent to effect development of each of the exposed silver halide emulsion layers, thereby oxidizing the developing agent;
2. the oxidized developing agent thereby cross-oxidizing the sulfonamido compound;
3. each cross-oxidized sulfonamido compound then cleaving, thus forming an imagewise distribution of diffusible dye or dye precursor as a function of the imagewise exposure of each of the silver halide emulsion layers; and
4. at least a portion of each of the imagewise distributions of diffusible dye or dye precursor diffusing to a dye image-receiving layer to provide an image.

It will be appreciated that there remains in the photographic element after transfer has taken place an imagewise distribution of dye or dye precursor in addition to developed silver. A color image comprising residual nondiffusible compound may be obtained in this element if the residual silver and silver halide are removed by any conventional manner well-known to those skilled in the photographic art, such as a bleach bath followed by a fix bath, a bleach-fix bath, etc. The imagewise distribution of dye or dye precursor may also diffuse out of the element into these baths, if desired, rather than to an image-receiving element. If a negative-working silver halide emulsion is employed in such photosensitive element, then a positive color image, such as a color transparency or motion-picture film, may be produced in this manner. If a direct-positive silver halide emulsion is employed in such photosensitive element, then a negative color image may be produced.

The photographic element in the above-described process can be treated with an alkaline processing composition to effect or initiate development in any manner. A preferred method for applying processing composition is by use of a rupturable container or pod which contains the composition. In general, the processing composition employed in my system contains the developing agent for development, although the composition could also just be an alkaline solution where the developer is incorporated in the photographic element, in which case the alkaline solution serves to activate the incorporated developer.

A photographic film unit according to my invention which is adapted to be processed by passing the unit between a pair of juxtaposed pressure-applying members, such as would be found in a camera designed for in-camera processing, comprises:

1. a photographic element as described above;
2. a dye image-receiving layer; and
3. means for discharging an alkaline processing composition within the film unit, such as a rupturable container which is adapted to be positioned during processing of the film unit so that a compressive force applied to the container by the pressure-applying members will effect a discharge of the container's contents within the film unit;

the film unit containing a silver halide developing agent.

The dye image-receiving layer in the above-described film unit can be located on a separate support adapted to be superposed on the photographic element after exposure thereof. Such image-receiving elements are generally disclosed, for example, in U.S. Pat. No. 3,362,819. A rupturable container is employed and is positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque, light-reflective layer, e.g., $TiO_2$, and then the photosensitive layer or layers described above. After exposure of the photosensitive element, a rupturable container containing an alkaline processing composition and an opaque process sheet are brought into superposed position. Pressure-applying members in the camera rupture the container and spread processing composition over the photographic element as the film is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which my sulfonamido chemistry can be employed are described in U.S. Pat. Nos. 3,415,644; 3,415,645; 3,415,646; 3,647,437; and 3,635,707.

In the formula listed above for my compounds which are alkali-cleavable upon oxidation, R is preferably hydrogen, although it could be any alkali labile group or hydrolyzable entity well-known to those skilled in the art, e.g., acetyl, mono-, di- or trichloroacetyl radicals, perfluoracyl, pyruvyl, alkoxyacyl, nitrobenzoyl, cyanobenzoyl, sulfonyl, sulfinyl, etc.

The nature of the ballast group in the formula for the compounds described above (Ballast) is not critical as long as it confers nondiffusibility to the compounds. Typical ballast groups include long-chain alkyl radicals linked directly or indirectly to either of the two aromatic rings of the compound. Useful ballast groups generally have at least 8 carbon atoms such as a substituted or unsubstituted alkyl group of 8 to 22 carbon atoms, an amide radical having 8 to 30 carbon atoms, a keto radical having 8 to 30 carbon atoms, etc.

In addition to Ballast, either of the aromatic rings in the above formula may have groups or atoms attached thereto such as the halogens, alkyl, aryl, alkoxy, aryloxy, nitro, amino, alkylamino, arylamino, amido, cyano, alkylmercapto, keto, carboalkoxy, heterocyclic groups, etc.

As previously mentioned, Col in the above formula represents a dye or dye precursor moiety. Such moieties are well-known to those skilled in the art and include dyes such as azo, azomethine, azopyrazolone, indoaniline, indophenol, anthraquinone, triarylmethane, alizarin, merocyanine, nitro quinoline, cyanine, indogoide, phthalocyanine, metal complexed dyes, etc., and dye precursors such as a leuco dye, a group containing a reduced imine linkage which upon oxidation forms an imine dye chromophore as described and claimed in my coworkers', Lestina and Bush, copending application Ser. No. 308,869 filed Nov. 22, 1972, a "shifted" dye which shifts hypsochromically or bathochromically when subjected to a different environment such as a change in pH, reaction with a material to form a complex, etc. Col could also be a coupler moiety such as a phenol, naphthol, indazolone, open-chain benzoyl acetanilide, pivalylacetanilide, malonamide, malonanilide, cyanoacetyl, coumarone, pyrazolone, compounds described in U.S. Pat. No. 2,756,142, etc. These compounds may contain a solubilizing group if desired. Examples of such dye groups include the following:

YELLOW DYE GROUPS

4-Hydroxy azobenzene

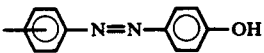

3-methyl-4-hydroxy azobenzene

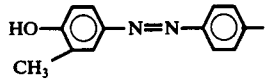

p-sulfhydryl azobenzene

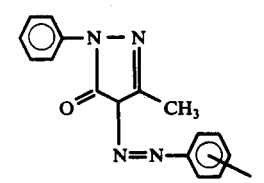

MAGENTA DYE GROUPS

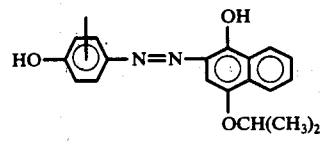

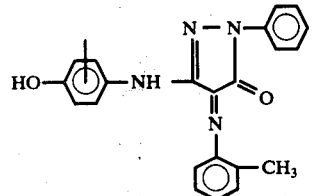

CYAN DYE GROUPS

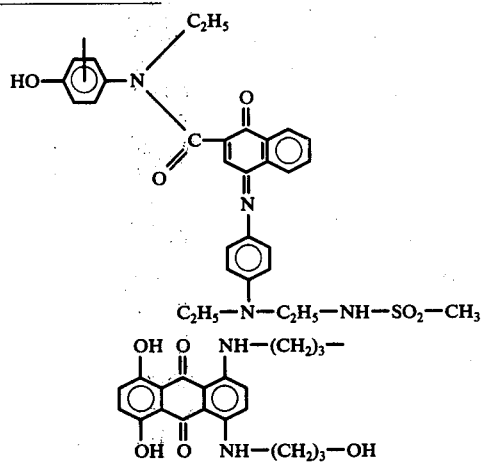

When dye precursor moieties are employed in my invention instead of dyes, they are converted to dyes by means well-known to those skilled in the art, e.g., oxidation, either in the photographic element, in the processing composition or in the dye image-receiving layer to form a visible dye. Such techniques are disclosed, for example, in British Pat. Nos. 1,157,501; 1,157,5 1,157,503; 1,157,504; 1,157,505; 1,157,506; 1,157,507; 1,157,508; 1,157,509; 1,157,510 and U.S. Pat. Nos. 2,774,668; 2,698,798; 2,698,244; 2,661,293; 2,559,643; etc.

Compounds within the scope of my invention include the following:

Compound No. 1

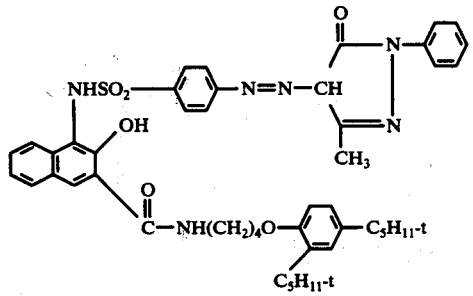

Compound No. 2

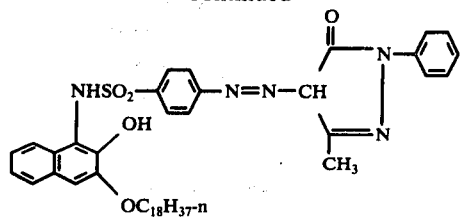
Compound No. 3
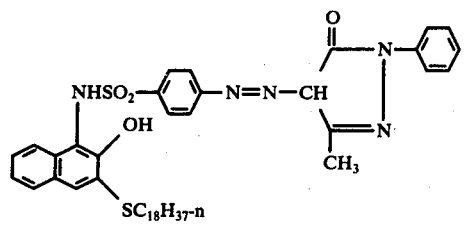
Compound No. 4
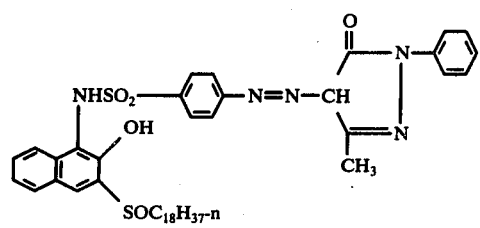
Compound No. 5
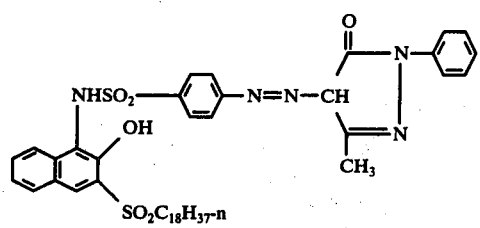
Compound No. 6
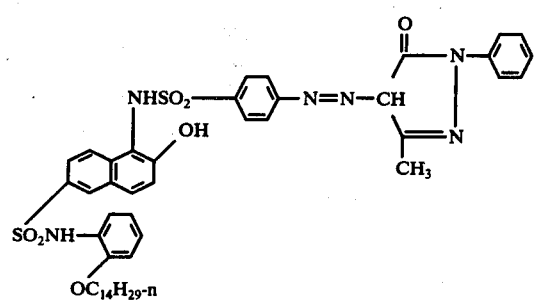
Compound No. 7
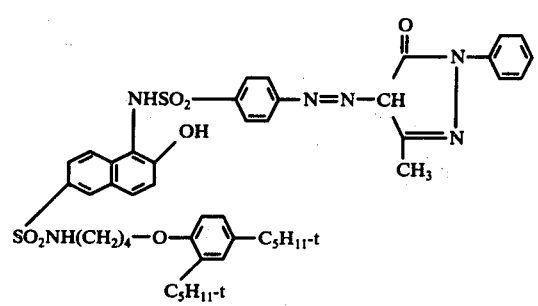
Compound No. 8
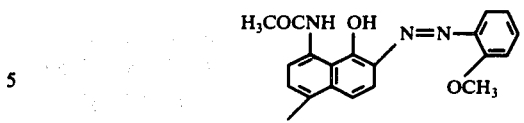
Compound No. 9
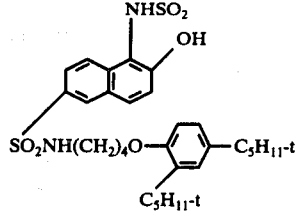
Compound No. 10
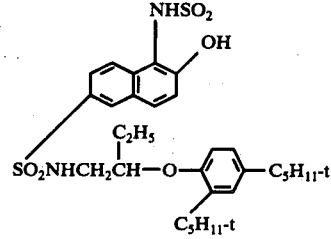
Compound No. 11
Compound No. 12
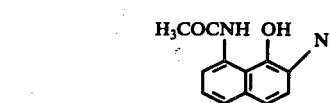
Compound No. 13

-continued

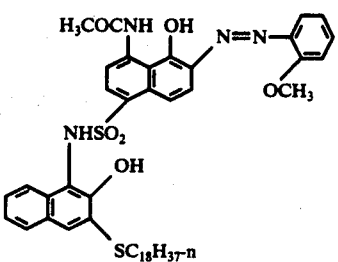
Compound No. 14

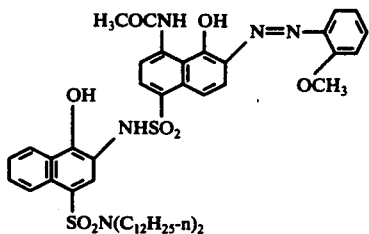

The film unit or assembly of the present invention may be used to produce positive images in single- or multicolors. In a three-color system, each silver halide emulsion layer of the film assembly will have associated therewith a dye image-providing material possessing a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith, and the red-sensitive silver halide emulsion layer will have a cyan dye image-providing material associated therewith. The dye image-providing material associated with each silver halide emulsion layer may be contained either in the silver halide emulsion layer itself or in a layer contiguous to the silver halide emulsion layer.

The concentration of the compounds which are alkali-cleavable upon oxidation that are employed in the present invention may be varied over a wide range depending upon the particular compound employed and the results which are desired. For example, the dye image-providing compounds of the present invention may be coated in layers by using coating solutions containing between about 0.5 and about 8 percent by weight of the dye image-providing compound distributed in a hydrophilic film-forming natural material or synthetic polymer, such as gelatin, polyvinyl alcohol, etc., which is adapted to be permeated by aqueous alkaline processing composition.

Any silver halide developing agent can be employed in my invention as long as it cross-oxidizes with the dye image-providing compounds described herein. The developer may be employed in the photosensitive element to be activated by the alkaline processing composition. Specific examples of developers which can be employed in my invention include:
hydroquinone
N-methylaminophenol
Phenidone (1-phenyl-3-pyrazolidone)
Dimezone (1-phenyl-4,4-dimethyl-3-pyrazolidone)
aminophenols
N-N-diethyl p-phenylenediamine
3-methyl-N,N-diethyl-p-phenylenediamine
3-methoxy-N-ethyl-N-ethoxy-p-phenylenediamine, etc.

The black-and-white developers in this list are preferred, however, since they avoid any propensity of staining the dye image-receiving layer.

In accordance with my invention, as was mentioned previously, the silver halide developer in my process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible dye or dye precursor which then diffuses to the receiving layer to provide the positive dye image. The diffusible moiety is transferable in alkaline processing composition either by virtue of its self-diffusivity or by having attached to it one or more solubilizing groups such as $COOH$, $SO_3H$, $SO_2NHX$, $OH$, $SH$, etc.

In using the dye-releasing compounds according to my invention, the production of diffusible dye or dye precursor images is a function of the reduction of developable silver halide images which may involve direct or reversal development of the silver halide emulsions with a silver halide developing agent. If the silver halide emulsion employed is a direct-positive silver halide emulsion, such as an internal-image emulsion or a solarizing emulsion, which is developable in unexposed areas, a positive image can be obtained on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the preformed dyes or the dye precursors imagewise as a function of the imagewise exposure of each of the silver halide emulsion layers. At least a portion of the imagewise distributions of diffusible dyes or dye precursors diffuse to the image-receiving layer to form a positive image of the original subject. After being contacted by the alkaline processing composition, a pH-lowering layer in the film unit or image-receiving unit (if such a layer is needed) lowers the pH of the film unit or image receiver to stabilize the image.

Internal-image silver halide emulsions useful in the above-described embodiment are direct-positive emulsions that form latent images predominantly inside the silver halide grains, as distinguished from silver halide grains that form latent images predominantly on the surface thereof. Such internal-image emulsions were described by Dewey et al in U.S. Pat. No. 2,592,250 issued Apr. 8, 1952, and elsewhere in the literature. Internal-image silver halide emulsions can be defined in terms of the increased maximum density obtained when developed with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20° C in Developer A below ("internal-type" developer) have a maximum density at least five times the maximum density obtained when an equally exposed silver halide emulsion is developed for 4 minutes at 20° C in Developer B described below ("surface-type" developer). Preferably, the maximum density in Developer A is at least 0.5 density unit greater than the maximum density in Developer B.

| Developer A | |
|---|---|
| Hydroquinone | 15 g |
| Monomethyl-p-aminophenol sulfate | 15 g |
| Sodium sulfite (desiccated) | 50 g |
| Potassium bromide | 10 g |
| Sodium hydroxide | 25 g |
| Sodium thiosulfate | 20 g |
| Water to make one liter | |

| Developer B | |
|---|---|
| P-hydroxyphenylglycine | 10 g |
| Sodium carbonate | 100 g |
| Water to make one liter | |

Internal-image silver halide emulsions which contain or which are processed in the presence of fogging or nucleating agents are particularly useful in the above-described embodiment since the use of fogging agents is a convenient way to inject electrons into the silver halide grains. Suitable fogging agents include the hydrazines disclosed in Ives U.S. Pat. Nos. 2,588,982 issued Mar. 11, 1952, and 2,563,785 issued Aug. 7, 1951; the hydrazides and hydrazones disclosed in Whitmore U.S. Pat. No. 3,227,552 issued Jan. 4, 1966; hydrazone quaternary salts described in U.S. Pat. No. 3,615,615; hydrazone-containing polymethine dyes as described in U.S. Pat. No. 3,718,470; or mixtures thereof. The quantity of fogging agent employed can be widely varied depending upon the results desired. Generally, the concentration of fogging agent is from about 1 to about 20 mg per square foot of photosensitive layer in the photographic element or from about 0.1 to about 2 grams per liter of developer if it is located in the developer.

Typical useful direct-positive emulsions are disclosed in U.S. Pat. Nos. 3,227,552 by Whitmore issued Jan. 4, 1966, 3,761,276 by Evans issued Sept. 25, 1973, 3,761,267 by Gilman et al, 3,761,266 by Milton, 3,703,584 by Motter, and the like.

In other embodiments, the direct-positive emulsions can be emulsions which have been fogged either chemically or by radiation on the surface of the silver halide grains to provide for development to maximum density without exposure. Upon exposure, the exposed areas do not develop, thus providing for image discrimination and a positive image. Silver halide emulsions of this type are very well-known in the art and are disclosed, for example, in U.S. Pat. Nos. 3,367,778 by Berriman issued Feb. 6, 1968, and 3,501,305, 3,501,306 and 3,501,307 by Illingsworth, all issued Mar. 17, 1970.

In still other embodiments, the direct-positive emulsions can be of the type described in Mees and James, *The Theory of the Photographic Process*, published by MacMillan Co., New York, N.Y., 1966, pp. 149-167.

Other embodiments in which my imaging chemistry can be employed include the techniques described in U.S. Pat. Nos. 3,227,550, 3,227,551, 3,227,552, and 3,364,022, wherein my dye image-providing materials are substituted for the nondiffusible dye-providing couplers described therein.

Another embodiment of my invention uses the image-reversing technique disclosed in British Pat. No. 904,364, page 19, lines 1-41. In this system my dye-releasing compounds are used in combination with physical development nuclei in a nuclei layer contiguous to the photosensitive silver halide emulsion layer.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a Carey Lea silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The silver halide emulsions used in this invention can comprise, for example, silver chloride, silver bromide, silver chlorobromide, silver bromoiodide, silver chlorobromoiodide or mixtures thereof. The emulsions can be coarse- or fine-grain and can be prepared by any of the well-known procedures, e.g., single-jet emulsions such as those described in Trivelli and Smith, *The Photographic Journal*, Vol. LXXIX, May, 1939 (pp 330–338), double-jet emulsions, such as Lippmann emulsions, ammoniacal emulsions, thiocyanate or thioether ripened emulsions such as those described in Nietz et al U.S. Pat. No. 2,222,264 issued Nov. 19, 1940; Illingsworth U.S. Pat. No. 3,320,069 issued May 16, 1967; and McBride U.S. Pat. No. 3,271,157 issued Sept. 6, 1966. Surface-image emulsions can be used or internal-image emulsions can be used such as those described in Davey et al U.S. Pat. No. 2,592,250 issued May 8, 1952; Porter et al U.S. Pat. No. 3,206,313 issued Sept. 14, 1965; Berriman U.S. Pat. No. 3,367,778 issued Feb. 6, 1968; and Bacon et al U.S. Pat. No. 3,447,927 issued June 3, 1969. The emulsions may be regular-grain emulsions such as the type described in Klein and Moisar, *J. Phot. Sci.*, Vol. 12, No. 5, Sept./Oct., 1964, (pp.242–251). Negative-type emulsions may be used or direct-positive emulsions may be used such as those described in Leermakers U.S. Pat. No. 2,184,013 issued Dec. 19, 1939; Kendall et al U.S. Pat. No. 2,541,472 issued Feb. 13, 1951; Berriman U.S. Pat. No. 3,367,778 issued Feb. 6, 1968; Schouwenaars British Pat. No. 723,019 issued Feb. 2, 1955; Illingsworth et al French Pat. No. 1,520,821 issued Mar. 4, 1968; Illingsworth U.S. Pat. No. 3,501,307 issued Mar. 17, 1970; Ives U.S. Pat. No. 2,563,785 issued Aug. 7, 1951; Knott et al U.S. Pat. No. 2,456,953 issued Dec. 21, 1948; and Land U.S. Pat. No. 2,861,885 issued Nov. 25, 1958.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color film unit according to this invention, each silver halide emulsion layer containing a dye image-providing material or having the dye image-providing material present in a contiguous layer may be separated from the other silver halide emulsion layers in the negative portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104; 3,043,692; 3,044,873; 3,061,428; 3,069,263; 3,069,264; 3,121,011; and 3,427,158.

Generally speaking, except where noted otherwise, the silver halide emulsion layers in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., galatin, are about 1 to 5 microns in thickness. Of course, these thicknesses are approximate only and can be modified according to the product desired.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described in Minsk U.S. Pat. No. 2,882,156 issued Apr. 14, 1959, and basic polymeric mordants such as described in U.S. Pat. No. 3,709,690 of Cohen et al issued Jan. 9, 1973. Other mordants useful in my invention include poly-4-vinylpyridine, the 2-vinyl pyridine polymer metho-p-toluene sulfonate and similar compounds described in Sprague et al U.S. Pat. No. 2,484,430 issued Oct. 11, 1949, and cetyl trimethylammonium bromide, etc. Effective mordanting compositions are also described in Whitmore U.S. Pat. No. 3,271,148 and Bush U.S. Pat. No. 3,271,147, both issued Sept. 6, 1966.

Furthermore, the image-receiving layer can be sufficient by itself to mordant the dye as in the case of use of an alkaline solution-permeable polymeric layer such as N-methoxymethyl polyhexylmethylene adipamide; partially hydrolyzed polyvinyl acetate; polyvinyl alcohol with or without plasticizers; cellulose acetate; gelatin; and other materials of a similar nature. Generally, good results are obtained when the image-receiving layer, preferably alkaline solution-permeable, is transparent and about 0.25 to about 0.40 mil in thickness. This thickness, of course, can be modified depending upon the result desired. The image-receiving layer can also contain ultraviolet absorbing materials to protect the mordanted dye images from fading due to ultraviolet light, brightening agents such as the stilbenes, courmarins, triazines, oxazoles, dye stabilizers such as the chromanols, alkylphenols, etc.

Use of a pH-lowering material in the dye image-receiving element of a film unit according to the invention will usually increase the stability of the transferred image. Generally, the pH-lowering material will effect a reduction in the pH of the image layer from about 13 or 14 at least 11 and preferably 5–8 within a short time after imbibition. For example, polymeric acids as disclosed in U.S. Pat. No. 3,362,819 or solid acids or metallic salts, e.g., zinc acetate, zinc sulfate, magnesium acetate, etc., as disclosed in U.S. Pat. No. 2,584,030 may be employed with good results. Such pH-lowering materials reduce the pH of the film unit after development to terminate development and substantially reduce further dye transfer and thus stabilize the dye image.

An inert timing or spacer layer can be employed in the practice of my invention over the pH-lowering layer which "times" or controls the pH reduction as a function of the rate at which alkali diffuses through the inert spacer layer. Examples of such timing layers include gelatin, polyvinyl alcohol or any of those disclosed in U.S. Pat. No. 3,455,686. The timing layer may be effective in evening out the various reaction rates over a wide range of temperatures, e.g., premature pH reduction is prevented when imbibition is effected at temperatures above room temperature, for example, at 95° to 100° F. The timing layer is usually about 0.1 to about 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc.

The alkaline processing composition employed in this invention is the conventional aqueous solution of an alkaline material, e.g., sodium hydroxide, sodium carbonate or an amine such as diethylamine, preferably possessing a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cps to about 200,000 cps. In certain embodiments of my invention, an opacifying agent, e.g., $TiO_2$, carbon black, etc., may be added to the processing composition.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge.

The alkaline solution-permeable, substantially opaque, light-reflective layer employed in certain embodiments of photographic film units of my invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zink oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layer, dark-colored opacifying agents, e.g., carbon black, nigrosine dyes, etc., may be added to it, or coated in a separate layer adjacent the light-reflective layer.

The supports for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film, poly(ethyleneterephthalate) film, polycarbonate film, poly-α-olefins such as polyethylene and polypropylene film, and related films or resinous materials. The support is usually about 2 to 6 mils in thickness.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in my invention are well-known to those skilled in the art and are described in *Product Licensing Index*, Vol. 92, December, 1971, publication 9293, p. 107, paragraph I, "Emulsion types"; they may be chemically and spectrally sensitized as described on p. 107, paragraph III, "Chemical sensitization", and pp. 108–109, paragraph XV, "Spectral sensitization", of the above article; they can be protected against the production of fog and can be stabilized against loss of sensitivity during keeping by employing the materials described on p. 107, paragraph V, "Antifoggants and stabilizers", of the above article; they can contain development modifiers, hardeners, and coating aids as described on pp. 107–108 paragraph IV, "Development modifiers"; paragraph VII, "Hardeners"; and paragraph XII, "Coating aids", of the above article; they and other layers in the photographic elements used in this invention can contain plasticizers, vehicles and filter dyes described on p. 108, paragraph XI, "Plasticizers and lubricants", and paragraph VIII, "Vehicles", and p. 109, paragraph XVI, "Absorbing and filter dyes", of the above article; they and other layers in the photographic elements used in this invention may contain addenda which are incorporated by using the procedures described on p. 109, paragraph XVII, "Methods of addition", of the above article; and they can be coated by using the various techniques described on p. 109, paragraph XVIII, "Coating procedures", of the above article, the disclosures of which are hereby incorporated by reference.

The following examples further illustrate the invention.

EXAMPLE I: Preparation of Compound No. 1

A. Phenyl-3-hydroxy-2-naphthoate

A mixture of 50 g (0.266 mole) 3-hydroxy-2-naphthoic acid, 27.3 g (0.29 mole) phenol, and 21.4 g (0.14 mole) phosphorus oxychloride was stirred and heated at 100° C for 3.5 hrs. Then 200 ml alcohol was added, and the mixture was heated one hour longer and cooled. The yellow product was collected and recrystallized from benzene to give 26.4 g (38%) of phenyl-3-hydroxy-2-naphthoate, m.p. 126°–130° C.

B.
3-Hydroxy-2-[4'-(2,4-di-t-pentylphenoxy)-n-butyl]-naphthamide

A mixture of 26.4 g (0.10 mole) phenyl-3-hydroxy-2-naphthoate and 30.6 g. (0.10 mole) α-(2,4-di-t-pentylphenoxy)-butylamine was stirred and heated at 180° C under vacuum for 3 hours. The mixture was poured in hexane, and the resulting yellow solid was collected and recrystallized twice from alcohol to give 26.4 g 3-hydroxy-2-[4'-(2,4-di-t-pentylphenoxy)-n-butyl]-naphthamide m.p. 118°–124° C.

C.
3-Hydroxy-4-(p-methoxyphenylazo)-2-[4'-(2,4-di-t-pentylphenoxy)-n-butyl]naphthamide To 20 g (0.042 mole) of 3-hydroxy-2-[4-(2,4-di-t-pentylphenoxy)-n-butyl]naphthamide in 200 ml tetrahydrofuran was added a solution of 8 g sodium hydroxide in 200 ml methanol. The mixture was cooled to 0° C and treated with a diazonium solution prepared from a solution of 5.2 g (0.042 mole) p-anisidine in 40 ml water containing 10 ml conc. hydrochloric acid and a solution of 2.9 g (0.042 mole) sodium nitrite in 30 ml water. Then 400 ml water was added, and the mixture was stirred at 0° C for 2 hrs. and at room temperature for one hour. The oil which separated after acidification with 30 ml acetic acid was extracted with ether. The solution was dried and concentrated to 21 g of a red oil which was used without further purification in the next step.

D.
4-Amino-3-hydroxy-2-[4'-(2,4-di-t-pentylphenoxy)-n-butyl]naphthamide

To a solution of 21 g (0.034 mole) crude 3-hydroxy-4-(p-methoxyphenylazo)-2-[4'-(2,4-di-t-pentylphenoxy)-n-butyl]-naphthamide in 400 ml alcohol was added a solution of 13.9 g (0.08 mole) 90% sodium dithionite in 75 ml water. The mixture was refluxed for 0.5 hrs, then cooled and diluted with 400 ml $H_2O$. The product was extracted into hexane, crystallized, and was collected and recrystallized from hexane to give 10 g yellow green solid, m.p. 93°–96° C.

E.
3-Hydroxy-4-[p-(1-phenyl-3-methyl-5-pyrazolon-4-yl)azo]-benzenesulfonamido-2-[4'-(2,4-di-t-pentylphenoxy-n-butyl]naphthamide (Compound No. 1)

To a solution of 5.0 g (0.0102 mole) of the aminonaphthol in 55 ml dry pyridine cooled to 10° C was added 4.2 g (0.0112 mole) 4-(p-chlorosulfonylphenylazo)-1-phenyl-3-methyl-5-pyrazolone. The mixture was stirred for 1 hour at 10° C and at room temperature overnight, then poured into ice-water containing 55 ml concentrated hydrochloric acid. The resulting orange solid was collected and recrystallized from alcohol to give 4.5 g product, m.p. 203°–205° C.

Anal: Calcd. for $C_{47}H_{54}N_6O_6S$: C, 67.9; H, 6.6; N, 10.1; S, 3.9.

Found: C, 67.9; H, 6.3; N, 10.4; S, 4.2.

EXAMPLE II: Preparation of Compounds No. 2 and 12

A. 3-octadecyloxy-2-naphthol

A mixture of 40.0 g (0.25 mole) 2,3-naphthalenediol, 70.0 g (0.26 mole) 1-octadecanol, a little p-toluenesulfonic acid, and 350 ml xylene was stirred and refluxed for 120 hrs., then treated with charcoal and cooled. There was obtained 71 g of white solid, which was recrystallized from hexane to give 42 g of 3-octadecyloxy-2-naphthol, m.p. 60°–62° C.

B. 1-(p-methoxyphenylazo)-3-octadecyloxy-2-naphthol

To a mixture of 35 g (0.085 mole) 3-octadecyloxy-2-naphthol, 12 g (0.30 mole) sodium hydroxide, 500 ml methanol, and 1000 ml tetrahydrofuran at 0°–5° was added a diazonium salt solution prepared from 10.5 g (0.085 mole) p-anisidine in 40 ml water containing 20 ml concentrated hydrochloric acid and a solution of 5.9 g (0.005 mole) sodium nitrite in 40 ml water. The mixture was stirred at 0°–5° for 1 hour and at room temperature for 1 hour then acidified with 40 ml acetic acid in 1000 ml water. There was obtained 40.5 g of a red solid, which was recrystallized from ethyl acetate to give red crystals, m.p. 95°–97° C.

C. 1-Amino-3-octadecyloxy-2-naphthol

To a mixture of 17 g (0.031 mole) 1-(p-methoxyphenylazo)-3-octadecyloxy-2-naphthol and 700 ml ethanol was added a solution 13.5 g (0.070 mole) sodium dithionite in 80 ml water. The mixture was refluxed for 2.5 hours, cooled, and filtered. The while solid, 11 g, was recrystallized from a mixture of hexane and ethyl acetate to give an off-white solid, m.p. 97°–99° C.

D.
3-Octadecyloxy-1-[p-(1-phenyl-3-methyl-5-pyrazolon-4-yl)azo]benzenesulfonamido-2-napthol (Compound No. 2)

To a solution of 4.3 g (0.010 mole) 1-amino-3-octadecyl-2-naphthol in 80 ml dry pyridine cooled to 10° was added 3.8 g (0.010 mole) 4-(p-chlorosulfonylphenylazo)-1-phenyl-3-methyl-5-pyrazolone. The mixture was stirred at 10°–15° C for 2 hours and at room temperature for 2 hours, then added to ice-water containing 80 ml concentrated hydrochloric acid. The yellow solid was collected, dried, and recrystallized from ethyl acetate to give 3.2 g yellow crystals, m.p. 150°–153° C.

Anal: Calcd. for $C_{44}H_{57}N_5O_5S$: C, 68.8; H, 7.5; N, 9.1; S, 4.2 Found: C, 69.0; H, 7.7; N, 9.0; S, 4.2.

E.
1[4-acetamido-5-hydroxy-6-(o-methoxyphenylazo)-naphthalene-1-sulfonamido]3-octadecyloxy-2-naphthol Compound No. 12

To a solution of 4.3 g (0.010 mole) 1-amino-3-octadecyl-2-naphthol in 100 ml pyridine at 10° C was added 4.3 g (0.010 mole) 4-acetamido-5-hydroxy-6-(o-methoxyphenylazo)naphthalene-1-sulfonyl chloride. The mixture was stirred at 10° C for 2 hours and at room temperature overnight, then added to ice-water containing 100 ml concentrated hydrochloric acid. The solid was collected and dissolved in chloroform. The solution was treated with silica gel, then concentrated to dryness, and the residue was triturated with hexane to give 3.4 g magenta solid, m.p. 200°–202° C.

Anal: Calcd. for $C_{47}H_{60}N_4O_7S$: C, 68.4; H, 7.3; N, 6.8; S, 3.9 Found: C, 68.6; H, 7.3; N, 6.7; S, 4.0

EXAMPLE III: Preparation of Compounds No. 3 and 13

A. 3-Octadecanethio-2-naphthol

To a mixture of 160 g (1.00 mole) 2,3-naphthalenediol, 287 g (1.00 mole) octadecanethiol, 1 g p-toluenesulfonic acid, and 600 ml xylene was stirred and refluxed for 72 hrs., then filtered and cooled. There was obtained 270 g of off-white solid, which was recrystallized from acetonitrile and hexane to give 3-octadecanethio-2-naphthol, m.p. 78°–80° C.

B.
1-(p-methoxyphenylazo)-3-octadecanethio-2-naphthol

To a mixture of 37 g (0.085 mole) 3-octadecanethio-2-naphthol, 12 g sodium hydroxide, 500 ml methanol, and 400 ml tetrahydrofuran cooled to 0° C was added a diazonium salt solution prepared from 10.5 g (0.085 mole) p-anisidine, 50 ml water, 20 ml concentrated hydrochloric acid and a solution of 5.9 g (0.085 mole) sodium nitrite in 40 ml water. The resulting mixture was diluted with 500 ml more tetrahydrofuran and stirred at 0° C for 2 hrs., then acidified with 40 ml acetic acid in 500 ml water. On filtration there was obtained 45 g of red solid, which was recrystallized from ethyl acetate to give red crystals, m.p. 95°–99° C.

C. 1-Amino-3-octadecanethio-2-naphthol

To a mixture of 18.5 g (0.033 mole) 1-(p-methoxyphenylazo)-3-octadecanethio-2-naphthol and 900 ml ethanol was added a solution of 13.5 g (0.070 mole) sodium dithionite in 100 ml water. The mixture was stirred and refluxed for 2.5 hrs., then cooled and filtered to yield 12 g of light brown solid which was crystallized from hexane-ethyl acetate to give a solid, m.p. 72°–75° C.

D.
3-Octadecanethio-1-[p-(1-phenyl-3-methyl-5-pyrazolon-4-yl)azo]benzenesulfonamido-2-naphthol Compound No. 3

To a solution of 4.4 g (0.010 mole) 1-amino-3-octadecanethio-2-naphthol in 80 ml pyridine at 10° C was added 3.8 g (0.010 mole) 4-(p-chlorosulfonylphenylazo)-1-phenyl-3-methyl-5-pyrazolone. The mixture was stirred at 10°–15° C for 2 hrs., and at room temperature for one hr., then added to ice-water containing 80 ml concentrated hydrochloric acid. The solid was collected and recrystallized from 150 ml 1:1 hexane-ethyl acetate to give 3.2 g of yellow product, m.p. 115°–116° C.

Anal: Calcd. for $C_{44}H_{57}N_5O_4S_2$: C, 67.4; H, 7.3; N, 8.9; S, 8.2 Found: C, 67.4; H, 7.6; N, 9.1; S, 8.6.

E.
1-[4-acetamido-5-hydroxy-6-(o-methoxyphenylazo)-naphthalene-1-sulfonamido]-3-octadecanethio-2-naphthol Compound No. 13

To a solution of 4.4 g (0.010 mole) 1-amino-3-octadecanethio-2-naphthol in 100 ml pyridine at 10° was added 4.3 g (0.010 mole) 4-acetamido-5-hydroxy-6-(o-methoxyphenylazo)naphthalene-1-sulfonyl chloride. The mixture was stirred at 10° C for 2 hrs. and at room temperature overnight, then added to ice-water containing 100 ml concentrated hydrochloric acid. The solid was collected and dissolved in hot chloroform. The solution was treated with charcoal and silica gel, then concentrated to dryness, and the residue was triturated with hexane to give 2.2 g solid, m.p. 200°–202° C.

Anal: Calcd. for $C_{47}H_{60}N_4O_6S_2$: C, 67.1; H, 7.2; N, 6.7; S, 7.6 Found: C, 66.8; H, 7.5; N, 6.5; S, 7.4.

EXAMPLE IV: Preparation of Compounds No. 4 and 5

A. 3-Octadecanethio-2-naphthyl acetate

A mixture of 90 g (0.21 mole) 3-octadecanethio-2-naphthol and 250 ml acetic anhydride was stirred and refluxed for 4 hrs., then cooled and filtered. There was obtained 90 g of solid, which was recrystallized from hexane to yield a solid, m.p. 65°–66° C.

B. 3-Octadecanesulfinyl-2-naphthyl acetate

To a solution of 35 g (0.075 mole) 3-octadecanethio-2-naphthyl acetate in 400 ml acetic acid at 50°–60° C was added a solution of 8.8 g (0.080 mole) 31% hydrogen peroxide in 50 ml acetic acid. The solution was heated at 60° C for 1.5 hr., then cooled and filtered. The solid was recrystallized from hexane-ethyl acetate to give 30 g of white solid, m.p. 91°–93° C.

C. 3-Octadecanesulfinyl-2-naphthol

To a solution of 25 g potassium hydroxide in 500 ml ethanol was added 25 g (0.051 mole) 3-octadecanesulfinyl-2-naphthyl acetate. The mixture was stirred at room temperature in a nitrogen atmosphere for 1.5 hr. then acidified with 5% hydrochloric acid. The solid was collected, dried, and recrystallized from hexane-ethyl acetate to give 17 g of light pink solid, m.p. 107°–108° C.

D. 1-(p-methoxyphenylazo)-3-octadecanesulfinyl-2-naphthol

To a solution of 13.0 g (0.029 mole) 3-octadecanesulfinyl-2-naphthol and 5.0 g sodium hydroxide in 300 ml methanol and 200 ml tetrahydrofuran at 0°–5° C was added a diazonium salt solution prepared from 3.6 g (0.029 mole) p-anisidine in 40 ml water containing 10 ml concentrated hydrochloric acid and a solution of 2.0 g (0.029 mole) sodium nitrite in 20 ml water. The red mixture was stirred at 5° for one hr. and at room temperature overnight, then cooled and acidified with 20 ml acetic acid in 400 ml water. The mixture was filtered to give 16 g of red solid, which could be recrystallized from ethyl acetate to give a solid, m.p. 108°–110° C.

E. 1-Amino-3-octadecanesulfinyl-2-naphthol

To a suspension of 14.0 g (0.020 mole) 1-(p-methoxyphenylazo)-3-octadecanesulfinyl-2-naphthol in 500 ml hot ethanol was added a solution of 12 g (0.060 mole) sodium dithionite in 60 ml water. The mixture was stirred and refluxed for one hr., then cooled and filtered. There was obtained 10.2 of solid, which was recrystallized from hexane, m.p. 95°–97° C.

F. 3-Octadecanesulfinyl-1-[p-(1-phenyl-3-methyl-5-pyrazolon-4-yl)azo]benzenesulfonamido-2-naphthol Compound No. 4

To a solution of 3.0 g (0.0065 mole) 1-amino-3-octadecanesulfinyl-2-naphthol in 80 ml pyridine cooled to 15° C was added 2.4 g (0.0065 mole) 4-p-chlorosulfonylphenylazo)-1-phenyl-3-methyl-5-pyrazolone. The mixture was stirred at 10°–15° C for 0.75 hr. and at room temperature for 2 hrs., then poured into ice-water containing 80 ml concentrated hydrochloric acid. The yellow product was collected, dried, and recrystallized from hexane-ethyl acetate to give 2.6 g of solid, m.p. 143°–153° C.

Anal: Calcd. for $C_{44}H_{57}N_5O_5S_2$: C, 66.1; H, 7.2; N, 8.8; S, 8.0 Found: C, 66.0; H, 7.6; N, 8.7; S, 8.0

G. 3-Octadecanesulfonyl-2-naphthyl acetate Compound No. 5

To a solution of 35 g (0.074 mole) 3-octadecanethio-2-naphthyl acetate in 400 ml acetic acid at 70° was added a solution of 17.6 g (0.16 mole) 31% hydrogen peroxide in 50 ml acetic acid. The mixture was stirred and heated at 95°–105° for 1.5 hr. then cooled and filtered. The solid was recrystallized from hexane to give 28.2 g of product, m.p. 89°–91° C.

H. 3-Octadecanesulfonyl-2-naphthol

To a solution of 25 g potassium hydroxide in 500 ml ethanol was added 25 g (0.050 mole) 3-octadecanesulfonyl-2-naphthyl acetate. The mixture was stirred at room temperature in a nitrogen atmosphere for 1.5 hr. then acidified with 5% hydrochloric acid. The solid was collected, dried, and recrystallized from hexane-ethyl acetate to give 18 g of white product, m.p. 98°–99° C.

I. 1-(p-methoxyphenylazo)-3-octadecanesulfonyl-2-naphthol

To a solution of 15 g (0.033 mole) 3-octadecanesulfonyl-2-phenol and 5.0 g sodium hydroxide in 300 ml methanol and 200 ml tetrahydrofuran at 0°–5° was added a diazonium salt solution prepared from 4.0 g (0.033 mole) p-anisidine in 50 ml water containing 10 ml concentrated hydrochloric acid and a solution of 2.2 g (0.033 mole) sodium nitrite in 20 ml water. The red mixture was stirred at 0°–5° for one hr., then acidified with 20 ml acetic acid in 400 ml water. There was obtained 16 g of red solid, which can be recrystallized from ethyl acetate to give a solid, m.p. 117°–119° C.

J. 1-Amino-3-octadecanesulfonyl-2-naphthol

To a suspension of 14 g (0.024 mole) 1-(p-methoxyphenylazo)-3-octadecanesulfonyl-2-naphthol in 500 ml hot ethanol was added a solution of 12 g (0.060 mole) sodium dithionite in 60 ml water. The mixture was stirred and refluxed for one hour, then cooled and filtered to give 11 g of solid, which can be recrystallized from hexane to give a solid, m.p. 84°–88° C.

K. 3-Octadecanesulfonyl-1-[p-(1-phenyl-3-methyl-5-pyrazolon-4-yl)azo]benzenesulfonamido-2-naphthol To a solution of 3.0 g (0.0063 mole) 1-amino-3-octadecanesulfonyl-2-naphthol in 80 ml pyridine cooled to 15° was added 2.4 g (0.0065 mole) 4-(p-chlorosulfonylphenylazo)-1-phenyl-3-methyl-5-pyrazolone. The mixture was stirred at 10°–15° for 0.75 hr. and at room temperature for 2 hours, then poured into ice-water containing 80 ml concentrated hydrochloric acid. The yellow product was collected and recrystallized from hexane-ethyl acetate and from ethanol to give 1.4 g solid, (Compound No. 5) m.p. 110°–115° C.

Anal: Calcd. for $C_{44}H_{57}N_5O_6S_2$: C, 64.8; H, 7.0; N, 8.6; S, 7.9 Found: C, 64.4; H, 7.0; N, 8.2; S, 7.9.

EXAMPLE V: Preparation of Compound No. 14

A. 4-(N,N-didodecylsulfamyl)-1-naphthol

A mixture of 18.1 g (0.063 mole) 1-acetoxy-4-naphthalenesulfonyl chloride, 22.4 g (0.063 mole) N,N-didodecylamine, 25 ml (18.1 g, 0.18 mole) triethylamine, and 200 ml acetonitrile was stirred at room temperature for 18 hrs. The mixture was diluted with ether and poured into water. The ether layer was separated, dried, and concentrated to 16.1 g of an amber oil, which was dissolved in 100 ml ethanol. To the solution was added 1.50 g (0.027 mole) potassium hydroxide; the mixture was stirred at room temperature for 2 days, acidified with hydrochloric acid, and diluted with water. The mixture was extracted with ether, and the extract was concentrated to 30.7 g of an amber oil, which partially crystallized.

B.
4-(N,N-didodecylsulfamyl)-2-(p-methoxyphenylazo)-1-naphthol

A solution of 30.7 g (0.027 mole) crude 4-(N,N-didodecylsulfamyl)-1-naphthol in a mixture of 100 ml tetrahydrofuran, 100 ml methanol, and 4.2 ml 50% sodium hydroxide solution was cooled in an ice-acetone bath and treated with a diazonium salt solution prepared from 3.30 g (0.027 mole) p-anisidine in 20 ml water containing 4.5 ml concentrated hydrochloric acid and 1.85 g (0.027 mole) sodium nitrite in 5 ml of water. The mixture was stirred at 0°-10° C for 2 hr., allowed to warm to room temperature, and filtered to give 14.6 g of red brown solid. This solid was recrystallized from hexane to give 8.2 g of a bright red powder, m.p. 100°-102° C.

Anal: Calcd. for $C_{41}H_{63}N_3O_4S_2$: C, 71.0; H, 9.2; N, 6.1; S, 4.6 Found: C, 71.0; H, 9.4; N, 6.1; S, 4.7.

C.
2-[4-acetamido-5-hydroxy-6-(o-methoxyphenylazo)-naphthalene-1-sulfonamido]-4-(N,N-didodecylsulfamyl)-1-naphthol A solution of 3.47 g (0.0050 mole) 4-(N,N-didodecylsulfamyl)-2-(p-methoxyphenylazo)-1-naphthol in 50 ml tetrahydrofuran containing 0.5 g 5% palladium/carbon catalyst was hydrogenated at low pressure and room temperature for 2 hr. The mixture was filtered and poured into water, then extracted with ether. The extract was concentrated to a gum which was dissolved in 50 ml pyridine. The solution was cooled in an ice bath, and 2.17 g (0.005 mole) 4-acetamido-5-hydroxy-6-(o-methoxyphenylazo)naphthalene-1-sulfonyl chloride was added. The mixture was stirred overnight at room temperature, then poured into ice-water containing 50 ml concentrated hydrochloric acid. The purple solid was recrystallized from dichloroethane and ethyl acetate to give, after drying under vacuum, an amorphous solid (Compound No. 14), m.p. 200°-202° C.

Anal: Calcd. for $C_{53}H_{73}N_5O_8S_2$: C, 65.5; H, 7.6; N, 7.2; S, 6.6 Found: C, 65.0; H, 7.2; N, 7.0; S, 6.5.

EXAMPLE VI: Preparation of Compounds No. 6 and 10

A.
2-Benzenesulfonyloxy-6-[N-(o-tetradecyloxyphenyl)]-naphthalenesulfonamide To a mixture of 29.5 g (0.10 mole) o-tetradecyloxyaniline in 300 ml pyridine cooled to 0° was added 38.3 g (0.10 mole) 2-benzenesulfonyloxy-6-naphthalenesulfonyl chloride. The mixture was stirred at 0° for 1.5 hr. and at room temperature overnight, then poured in ice water containing 300 ml hydrochloric acid. The solid was collected and recrystallized from isopropyl alcohol containing a little ethyl acetate and acetic acid to give 47.9 g product, m.p. 91°-93° C.

B.
1-(p-methoxyphenylazo)-6-[N-(o-tetradecyloxyphenyl)-sulfamyl]-2-naphthol

A solution of 43.9 g (0.068 mole) 2-benzenesulfonyloxy-6-[N-(o-tetradecyloxyphenyl)]naphthalenesulfonamide and 20.2 g sodium hydroxide in 600 methanol was refluxed for 4 hrs., then cooled and diluted with 400 ml of tetrahydrofuran. The resulting mixture was cooled to −10° C and treated with a diazonium salt solution prepared from 8.8 g (0.068 mole) p-anisidine in 120 ml water containing 20 ml concentrated hydrochloric acid and a solution of 4.6 g (0.068 mole) sodium nitrite in 80 ml water. The mixture was stirred at 0° C for 45 min. and at ambient temperature for 45 min., then poured into 1900 ml water containing 85 ml acetic acid. The product was extracted with methylene chloride. The extract was dried and concentrated to dryness, and the residue was recrystallized from 200 ml isopropyl alcohol containing 20 ml ethyl acetate to give 33.5 g of solid, m.p. 118.5°-121° C.

C.
1-[p-(1-phenyl-3-methyl-5-pyrazolon-4-yl)-azo]benzenesulfonamido-6-[N-(o-tetradecyloxyphenyl)sulfamyl]-2-naphthol Compound No. 6

A mixture of 12.9 g (0.020 mole) 1-(p-methoxyphenylazo)-6-[N-(o-tetradecyloxyphenyl)sulfamyl[-2-naphthol and 200 ml alcohol was heated to boiling and treated with 11.4 g sodium dithionite in 45 ml water. The mixture was poured in ice water containing 180 ml 1 N hydrochloric acid. The solid which separated was collected and dissolved in ethyl acetate. The solution was dried and concentrated, and the residue was dissolved in 100 ml pyridine. The solution was cooled to 0° and treated with 7.5 g (0.020 mole) 4-(p-chlorosulfonylphenylazo)-1-phenyl-3-methyl-5-pyrazolone. The mixture was stirred at 0° C for 2 hrs. and at room temperature overnight, then poured into ice water containing 100 ml hydrochloric acid. The solid was collected and recrystallized from ethanol, ethyl acetate, and a mixture of isopropyl alcohol-ethyl acetate to give 10.2 g of product.

Anal: Calcd. for $C_{49}H_{62}N_6O_8S_2$: C, 63.5; H, 6.7; N, 9.1; S, 6.9 Found: C, 63.2, 62.9; H, 6.8, 7.0; N, 8.7, 8.6; S, 6.9.

D.
1-[4-acetamido-5-hydroxy-6-(o-methoxyphenylazo)-naphthalene-1-sulfonamido]-6-[N-(o-tetradecyloxyphenyl)sulfamyl]-2-naphthol Compound No. 10

A mixture of 6.45 g (0.010 mole) 1-(p-methoxyphenylazo)-6-[N-o-tetradecyloxyphenyl)sulfamyl]-2-naphthol and 100 ml alcohol was heated to boiling and treated with 5.7 g sodium dithionite in 24 ml water for 10 min. The solution was poured into ice water containing 80 ml 1 N hydrochloric acid. The mixture was extracted with dichloroethane, and the extracts were dried and concentrated to 5.7 g residue. This was dissolved in 75 ml pyridine; the solution was cooled to 0° and treated with 4.3 g (0.01 mole) 4-acetamido-5-hydroxy-6-(o-methoxyphenylazo)naphthalene-1-sulfonyl chloride. The mixture was stirred at 0° C for 2 hrs. and at room temperature overnight, then poured in ice water containing 80 ml concentrated hydrochloric acid. The solid was collected and recrystallized twice from methoxyethanol to give 5.1 g of solid, m.p. 219°-220° C.

EXAMPLE VII: Preparation of Compounds No. 7 and 8

A.
1-(p-methoxyphenylazo)-6-[N-4'-(2,4-di-t-pentylphenoxy)-butyl]-sulfamyl-2-naphthol To a solution of 45.7 g (0.15 mole) 4-(2,4-di-t-pentylphenoxy) butylamine in 450 ml pyridine cooled to 0° C was added 57.3 g (0.15 mole) 2-benzenesulfonyloxy-6-naphthalenesulfonyl chloride. The mixture was stirred briefly at 0° C and at room temperature overnight, then poured into ice water containing 500 ml concentrated hydrochloric acid. The solid which separated was dissolved in chloroform. The solution was dried and concentrated. The residue was dissolved in 1300 ml methanol containing 45 g sodium hydroxide. The solution was refluxed for 4 hrs., then cooled and diluted with 900 ml tetrahydrofuran. To this solution cooled in an ice bath was added a diazonium salt solution prepared from 19.9 g (0.15 mole) p-anisidine dissolved in 250 ml water containing 42.5 ml concentrated hydrochloric acid and a solution of 10.3 g (0.15 mole) sodium nitrite in 180 ml water. The resulting mixture was stirred at 0° C for 45 min. and at room temperature for 1 hour, then poured into 5 liters of water containing 200 ml acetic acid. The oil which separated was extracted with methylene chloride, and the solution was concentrated to dryness. The residue was crystallized from 500 ml methanol, yielding 17.3 g of crystalline product.

B.
1-amino-6-[N-4'-(2,4-di-t-pentylphenoxy)butyl]-sulfamyl-2-naphthol hydrochloride A mixture of 6.45 g (0.010 mole) 1-(p-methoxyphenylazo)-6-[N-4'-(2,4-di-t-pentylphenoxy)butyl]-sulfamyl-2-naphthol and 100 ml alcohol was heated to boiling and treated with 5.7 g sodium dithionite in 25 ml water. The mixture was poured into 1000 ml water containing 80 ml concentrated hydrochloric acid. There was obtained 4.3 g of the aminonaphthol hydrochloride.

C.
1-[4-acetamido-5-hydroxy-6-(o-methoxyphenylazo)-naphthalene-1-sulfonamido]-6-[N-4'-(2,4-di-t-pentylphenoxy)-butyl]sulfamyl-2-naphthol Compound No. 8

To a mixture of 3.7 g (0.007 mole) 1-amino-6-[N-4'(2,4-di-t-pentylphenoxy)-butyl]sulfamyl-2-naphthol hydrochloride and 50 ml pyridine cooled to 0° was added 3.1 g (0.007 mole) 4-acetamido-5-hydroxy-6-(o-methoxyphenylazo)naphthalene-1-sulfonyl chloride. The mixture was stirred at 0° for 2 hr. and at room temperature for 4 hrs., then poured into ice water containing 50 ml concentrated hydrochloric acid. The solid was extracted with dichloromethane-ethyl acetate. The solution was dried and concentrated, and the residue was recrystallized from methanolethyl acetate. The solid obtained was dissolved in ethyl acetate, and the solution poured into a large volume of hexane. There was obtained 3.2 g of a solid, m.p. 177°–198° C.

Anal: Calcd. for $C_{49}H_{57}N_5O_9S_2$: C, 63.7; H, 6.2; N, 7.6; S, 6.9 Found: C, 63.6; H, 6.2; N, 7.7; S, 6.9.

D.
1-[p-(1-phenyl-3-methyl-5-pyrazolon-4-yl)azo]-benzenesulfonamido-6-[N-4'-(2,4-di-t-pentylphenoxy)-butyl]sulfamyl-2-naphthol Compound No. 7

A solution of 9.00 g (0.014 mole) 1-(p-methoxyphenylazo)-6-[N-4'-(2,4-di-t-pentylphenoxy)butyl]sulfamyl-2-naphthol in 150 ml ethanol was heated to boiling and treated with 8.1 g sodium dithionite in 35 ml water. The solution was poured into 1500 ml ice water containing 125 ml concentrated hydrochloric acid. Salt was added, and the precipitated solid was collected, dried, and dissolved in 100 ml pyridine. The solution was cooled to 0° C and treated with 5.26 g (0.014 mole) 4-(p-chlorosulfonylphenylazo)-1-phenyl-3-methyl-5-pyrazolone. The mixture was stirred at 0° for 1.5 hr. and at room temperature for 3 hr. then poured into ice water containing 100 ml concentrated hydrochloric acid. The solid was recrystallized from methanol to give 7.0 g of product, m.p. 193°–195° C.

Anal: Calcd. for $C_{46}H_{54}N_6O_7S_2$: C, 63.7; H, 6.3; N, 9.7; S, 7.4. Found: C, 63.4; 63.4; H, 6.4, 6.4; N, 9.8, 10.0; S, 7.2, 7.4.

EXAMPLE VIII: Preparation of Compound No. 9

A.
1-(p-methoxyphenylazo)-6-[N-β-(2,4-di-t-pentylphenoxy)-butyl]sulfamyl-2-naphthol To a solution of 20.7 g (0.054 mole) 2-benzene-sulfonyloxy-6-naphthalenesulfonyl chloride in 150 ml pyridine cooled in an ice bath was added 16.5 g (0.054 mole) β-(2,4-di-t-pentylphenoxy) butylamine. The mixture was stirred overnight at room temperature, then poured in ice water containing 150 ml concentrated hydrochloric acid. There was obtained 34.8 g of a gummy solid, which was dissolved in 450 ml methanol containing 16.2 g sodium hydroxide. The solution was refluxed for 2.5 hr., then diluted with 320 ml tetrahydrofuran, and cooled to −10° C. To this solution was added a diazonium salt solution prepared from 6.6 g (0.054 mole) p-anisidine dissolved in 90 ml water containing 15.3 ml concentrated hydrochloric acid and a solution of 3.7 g sodium nitrite in 65 ml water. The mixture was stirred at 0° C for one hr. and at room temperature for one hr., then poured in 1800 ml water containing 70 ml acetic acid. The solid was extracted with methylene chloride; the solution was dried and concentrated, and the residue was crystallized from 250 ml methanol to give 15.0 g of product, m.p. 169°–171° C.

B.
1-[4-acetamido-5-hydroxy-6-(o-methoxyphenylazo)-naphthalene-1-sulfonamido]-6-[N-β-(2,4-di-t-pentylphenoxy)-butyl]sulfamyl-2-naphthol A solution of 7.25 g (0.011 mole) of 1-(p-methoxyphenylazo)-6-[N-β-(2,4-di-t-pentylphenoxy)butyl]sulfamyl-2-naphthol in 120 ml ethanol was heated to boiling and treated with 7.9 g sodium dithionite in 35 ml water. The mixture was poured in ice water containing 100 ml 1 N hydrochloric acid. Salt was added, and the precipitated solid was collected, dried, and dissolved in 80 ml pyridine. The solution was cooled in an ice bath, and 4.9 g (0.011 mole) 4-acetamido-5-hydroxy-6-(o-methoxyphenylazo)naphthalene-1-sulfonyl chloride was added. The mixture was stirred at 0° C for 1 hour and at room temperature overnight, then poured in ice water containing 80 ml concentrated hydrochloric acid. The solid was dissolved in chloroform-ethyl acetate and filtered through a pad of silica gel. The filtrate was concentrated to dryness, and the residue was recrystallized from methanol to give 5.7 g of product, m.p. 160°–167° C.

Anal: Calcd. for $C_{49}H_{57}N_5O_9S_2$: C, 63.7; H, 6.2; N, 7.6; S, 6.9 Found: C, 63.4; H, 5.9; N, 7.9; S, 6.7.

EXAMPLE IX: Preparation of Compound No. 11

A. 8-Hexadecanesulfonamido-2-naphthol

A solution of 51.4 g (0.33 mole) 8-amino-2-naphthol in 500 ml pyridine was cooled to 0° and treated with 108.0 g (0.33 mole) hexadecanesulfonyl chloride. The mixture was stirred briefly at 0° C and overnight at room temperature, then poured into ice water containing 500 ml concentrated hydrochloric acid. The solid was collected, washed, dried, and recrystallized from benzene to give 100 g of product, m.p. 103.5°–107° C.

B. 8-Hexadecanesulfonamido-1-(p-methoxyphenylazo)-2-naphthol

To a stirred mixture of 89.5 g (0.20 mole) 8-hexadecanesulfonamido-2-naphthol, 37 g sodium hydroxide, 1800 ml methanol, and 1200 ml tetrahydrofuran at 0° was added a diazonium salt solution prepared from 24.6 g (0.20 mole) p-anisidine dissolved in 360 ml water containing 60 ml concentrated hydrochloric acid and a solution of 13.8 g (0.20 mole) sodium nitrite in 240 ml water. The addition required 15 min., and the mixture was stirred at 0° for 0.5 hr. and at room temperature for 0.5 hr. longer before being poured into 6 liters of water containing 250 ml acetic acid. There was obtained 107.7 g of product.

C. 1-[4-acetamido-5-hydroxy-6-(o-methoxyphenylazo)-naphthalene-1-sulfonamido]-8-hexadecanesulfonamido-2-naphthol A solution of 1.16 g (0.022 mole) 8-hexadecanesulfonamido-1-(p-methoxyphenylazo)-2-naphthol in 20 ml ethanol was heated to boiling and treated with 1.56 g sodium dithionite in 4 ml water. The mixture was cooled to room temperature and diluted with water. The resulting solid was collected and dried.

To a solution of 0.85 g (0.0018 mole) crude 1-amino-8-hexadecanesulfonamido-2-naphthol in 16 ml pyridine at 0° C was added 0.81 g (0.0018 mole) 4-acetamido-5-hydroxy-6-(o-methoxyphenylazo)naphthalene-1-sulfonyl chloride. The mixture was stirred overnight at room temperature, then poured in ice water containing 18 ml concentrated hydrochloric acid. The product was dried and triturated first with hot 1:1 dioxaneisopropyl alcohol and then with hot methanol to give 0.85 g of product, m.p. 177°–180° C.

Anal: Calcd. for $C_{45}H_{57}N_5O_8S_2$: C, 62.8; H, 6.7; N, 8.1; S, 7.5 Found: C, 62.1, 62.3; H, 6.7, 6.9; N, 8.3, 8.4; S, 7.5.

EXAMPLE X: Photographic Tests

To photographically test the compounds prepared in Examples 1–9, samples of the compounds identified in the following table were incorporated in single-layer photographic elements comprising a layer containing a negative-working silver halide emulsion (0.8μ cubic AgBr) coated at 86 mg silver/ft², 300 mg gelatin/ft², and $5 \times 10^{-5}$ moles/ft² of each compound dissolved in an equal weight, i.e., 1:1 weight ratio, of diethyl lauramide.

Samples of the photographic element were exposed through a graduated-density test object. A processing composition comprising 0.75 grams of 4-hydroxymethyl-4-methyl-1-phenyl-3-pyrazolidone, 20.0 grams of sodium hydroxide and 25.0 grams of hydroxyethylcellulose per liter of water was employed in a pod and was spread between the exposed surface of the photosensitive element and a superposed dye image-receiving element comprising a support coated with 200 mg/ft² of gelatin and 200 mg/ft² of the mordant copoly[styrene/(-vinylbenzyl)trihexylammonium chloride], by passing the transfer "sandwich" between a pair of juxtaposed pressure rollers.

After one minute, the receiving element was separated from the photosensitive element and the maximum and minimum densities of the transferred dye images were measured as recorded in the table below:

| Compound No. | $D_{min}$ | $D_{max}$ |
| --- | --- | --- |
| 1 | 0.43 | 1.30 |
| 2 | .60 | 1.40 |
| 3 | .56 | 2.22 |
| 4 | .37 | 1.40 |
| 5 | .35 | 1.44 |
| 6 | .47 | 2.04 |
| 7 | .38 | 2.08 |
| 8 | .35 | 2.00 |
| 9 | .25 | 1.70 |
| 11 | .59 | 1.58 |
| 12 | .35 | 1.36 |
| 13 | .19 | 0.93 |
| 14 | .12 | 1.24 |

EXAMPLE XI: Comparison Test

This example compares the results obtained with para- and ortho-sulfonamidophenols.

Samples of Compounds:

Compound p-SP

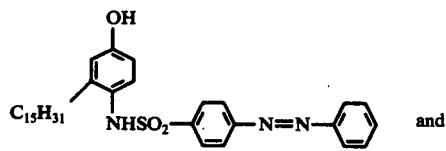

and

Compound o-SP

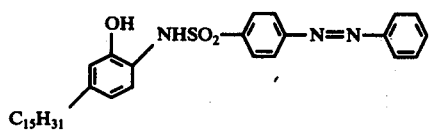

were incorporated in single-layer photographic elements comprising a layer containing a negative-working, silver halide emulsion (0.8μ cubic AgBr) at 100 mg Ag/ft², gelatin at 450 mg/ft², and the above compounds at 60 mg/ft² dissolved in di-n-butylphthalate at 120 mg/ft².

Separate samples of the elements were exposed through a graduated-density test object and immersed for various times at 23° C in a 0.1 N sodium hydroxide solution containing 0.5 g/l 1-phenyl-3-pyrazolidone. The samples were then brought in contact with a receiving element comprising a coacervate mordant consisting of N-n-hexadecyl-N-morpholinium ethosulfate at 150 mg/ft² and methyl-tri-n-dodecylammonium-p-toluenesulfonate at 23 mg/ft² coated in gelatin at 740 mg/ft². After five minutes, the elements were separated, the light-sensitive samples were bleached, fixed and washed, and the receiving elements were washed. The following results were obtained:

| Sample With Compound | Development Time (Seconds) | Maximum Ag Density |
|---|---|---|
| p-SP | 16 | 0.17 |
| p-SP | 32 | 0.32 |
| p-SP | 64 | 0.39 |
| o-SP | 16 | 0.07 |
| o-SP | 32 | 0.10 |
| o-SP | 64 | 0.16 |

In the receiving elements processed with photographic elements containing the p-sulfonamidophenol, well-defined, yellow negative images were produced. However, no dye images were apparent in the receiving elements processed with photographic elements containing the o-sulfonamidophenol. Since markedly less silver development and substantially no dye transfer was obtained using the o-sulfonamidophenol as compared to the p-sulfonamidophenol, it was unexpected to find that the o-sulfonamidonaphthols of my invention would provide a suitable transfer image.

The invention has been described in detail with particular reference to certain preferred embodiments thereof, but it will be understood that variations and modifications can be effected within the spirit and scope of the invention.

I claim:

1. A photographic element comprising a support having thereon at least one photosensitive silver halide emulsion layer having associated therewith a nondiffusible o-sulfonamidonaphthol compound having a diffusible color-providing moiety attached through the sulfonamido group of said compound to the naphthalene moiety of said compound, said naphthalene moiety having a ballast radical of such molecular size and configuration as to render said compound nondiffusible during development in an alkaline processing composition.

2. A photographic element comprising a support having thereon at least one photosensitive silver halide emulsion layer having associated therewith a nondiffusible sulfonamidonaphthol compound which is alkali-cleavable upon oxidation to release a diffusible color-providing moiety from the benzene nucleus, said compound having the formula:

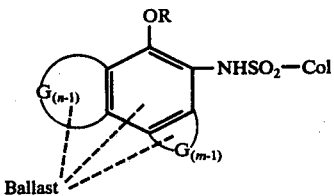

wherein:
A. Col is a dye or dye precursor moiety;
B. Ballast is an organic ballasting radical of such molecular size and configuration as to render said compound nondiffusible during development in an alkaline processing composition;
C. R is hydrogen or an alkali labile group;
D. G represents an aromatic ring directly fused to the benzene nucleus to form a naphthalene nucleus; and
E. n and m are dissimilar positive integers of 1 to 2.

3. The photographic element of claim 2 wherein R is H, n is 2, m is 1 and Col is an azo dye.

4. The photographic element of claim 2 wherein R is H, n is 1, m is 2 and Col is an azo dye.

5. The photographic element of claim 2 wherein there are red-, green- and blue-sensitive silver halide emulsion layers each having associated therewith said nondiffusible sulfonamidonaphthol compound containing, respectively, cyan, magenta and yellow image dye providing moieties.

6. The photographic element of claim 2 wherein each silver halide emulsion is a direct positive silver halide emulsion.

7. A photographic film unit comprising:
A. a photographic element comprising a support having thereon at least one photosensitive silver halide emulsion layer having associated therewith a nondiffusible o-sulfonamidonaphthol compound having a diffusible color-providing moiety attached through the sulfonamido group of said compound to the naphthalene moiety of said compound, said naphthalene moiety having a ballast radical of such molecular size and configuration as to render said compound nondiffusible during development in an alkaline processing composition;
B. a dye image-receiving layer; and
C. means for discharging an alkaline processing composition within said film unit; said film unit containing a silver halide developing agent.

8. A photographic film unit comprising:
A. a photographic element comprising a support having thereon at least one photosensitive silver halide emulsion layer having associated therewith a nondiffusible sulfonamidonaphthol compound which is alkali-cleavable upon oxidation to release a diffusible color-providing moiety from the benzene nucleus, said compound having the formula:

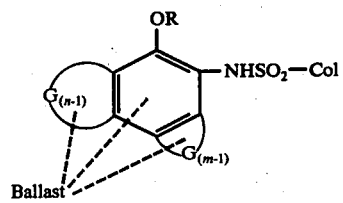

wherein:
a. Col is a dye or dye precursor moiety;
b. Ballast is an organic ballasting radical of such molecular size and configuration as to render said compound nondiffusible during development in an alkaline processing composition;
c. R is hydrogen or an alkali labile group;
d. G represents an aromatic ring directly fused to the benzene nucleus to form a naphthalene nucleus; and
e. n and m are dissimilar positive integers of 1 to 2;
B. a dye image-receiving layer; and
C. means for discharging an alkaline processing composition within said film unit; said film unit containing a silver halide developing agent.

9. The film unit of claim 8 where R is H, n is 2, m is 1 and Col is an azo dye.

10. The film unit of claim 8 where R is H, n is 1, m is 2 and Col is an azo dye.

11. The film unit of claim 8 wherein there are red-, green- and blue-sensitive silver halide emulsion layers each having associated therewith said nondiffusible sulfonamidonaphthol compound containing, respectively, cyan, magenta and yellow image dye providing moieties.

12. The film unit of claim 8 wherein each silver halide emulsion is a direct positive silver halide emulsion.

13. The film unit of claim 8 wherein said dye image-receiving layer is located in said photographic element between said support and the lowermost photosensitive silver halide emulsion layer.

14. The film unit of claim 8 wherein said dye image-receiving layer is coated on a separate support and is adapted to be superposed on said photographic element after exposure thereof.

15. The film unit of claim 8 wherein said discharging means is a rupturable container and is so positioned during processing of said film unit that a compressive force applied to said container by pressure-applying members will effect a discharge of the container's contents between said dye image-receiving layer and the layer most remote from the support of said photographic element.

16. A process for producing a photographic transfer image in color comprising:
  A. imagewise-exposing a photographic element comprising a support having thereon at least one photosensitive silver halide emulsion layer having associated therewith a nondiffusible $o$-sulfonamidonaphthol compound having a diffusible color-providing moiety attached through the sulfonamido group of said compound to the naphthalene moiety of said compound, said naphthalene moiety having a ballast radical of such molecular size and configuration as to render said compound nondiffusible during development in an alkaline processing composition;
  B. treating said element with an alkaline processing composition in the presence of a silver halide developing agent to effect development of each of said exposed silver halide emulsion layers, thereby oxidizing said developing agent;
    i. said oxidized developing agent thereby cross-oxidizing said sulfonamidonaphthol compound; and
    ii. said sulfonamidonaphthol compound then cleaving, thus forming an imagewise distribution of diffusible color-providing moiety as a function of said imagewise exposure of each of said silver halide emulsion layers; whereby at least a portion of said imagewise distribution of diffusible color-providing moiety diffuses to a dye image-receiving layer to provide an image.

17. A process for producing a photographic transfer image in color comprising:
  A. imagewise-exposing a photographic element comprising a support having thereon at least one photosensitive silver halide emulsion layer having associated therewith a nondiffusible sulfonamidonaphthol compound which is alkali-cleavable upon oxidation to release a diffusible color-providing moiety from the benzene nucleus, said compound having the formula:

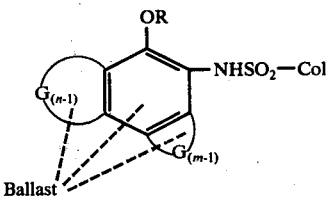

wherein:
  a. Col is a dye or dye precursor moiety;
  b. Ballast is an organic ballasting radical of such molecular size and configuration as to render said compound nondiffusible during development in an alkaline processing composition;
  c. R is hydrogen or an alkali labile group;
  d. G represents an aromatic ring directly fused to the benzene nucleus to form a naphthalene nucleus; and
  e. $n$ and $m$ are dissimilar positive integers of 1 to 2;
  B. treating said element with an alkaline processing composition in the presence of a silver halide developing agent to effect development of each of said exposed silver halide emulsion layers, thereby oxidizing said developing agent;
  C. said oxidized developing agent thereby cross-oxidizing said sulfonamidonaphthol compound;
  D. said sulfonamidonaphthol compound then cleaving, thus forming an imagewise distribution of diffusible dye or dye precursor as a function of said imagewise exposure of each of said silver halide emulsion layers; and
  E. at least a portion of said imagewise distributions of diffusible dye or dye precursor diffusing to a dye image-receiving layer to provide an image.

18. The process of claim 17 wherein R is H, $n$ is 2, $m$ is 1 and Col is an azo dye.

19. The process of claim 17 wherein R is H, $n$ is 1, $m$ is 2 and Col is an azo dye.

20. The process of claim 17 wherein there are red-, green-, and blue-sensitive silver halide emulsion layers each having associated therewith said nondiffusible sulfonamidonaphthol compound containing, respectively, cyan, magenta and yellow image dye providing moieties.

21. The process of claim 17 wherein each silver halide emulsion is a direct positive silver halide emulsion.

* * * * *